United States Patent
Roy et al.

(10) Patent No.: US 8,391,866 B2
(45) Date of Patent: *Mar. 5, 2013

(54) METHOD AND SYSTEM FOR RESELECTING AN ACCESS POINT

(75) Inventors: Vincent Roy, Longueuil (CA); Paul Marinier, Brossard (CA); Marian Rudolf, Montreal (CA); Angelo Cuffaro, Laval (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/478,584

(22) Filed: May 23, 2012

(65) Prior Publication Data

US 2012/0236826 A1    Sep. 20, 2012

Related U.S. Application Data

(63) Continuation of application No. 11/319,811, filed on Dec. 28, 2005, now Pat. No. 8,190,155.

(60) Provisional application No. 60/679,834, filed on May 11, 2005.

(51) Int. Cl.
*H04W 4/00* (2009.01)

(52) U.S. Cl. ........... 455/435.2; 455/436; 455/432.1; 455/550.1; 455/561; 370/329

(58) Field of Classification Search ......... 455/438–439, 455/435.2

See application file for complete search history.

(56) References Cited

U.S. PATENT DOCUMENTS

| 5,640,677 A | 6/1997 | Karlsson |
| 5,790,952 A | 8/1998 | Seazholtz et al. |

(Continued)

FOREIGN PATENT DOCUMENTS

| CN | 1602109 | 3/2005 |
| JP | 2001-268619 | 9/2001 |

(Continued)

OTHER PUBLICATIONS

IEEE 802.11e, Nov. 2005, Amendment to Standard for Information Technology—Telecommunications and Information Exchange Between Systems—LAN/MAN requirements—Part 11: Wireless LAN Medium Access Control (MAC) and Physical Layer (PHY) Specifications, Amendment 8: Medium Access Control (MAC) Quality of Service (QoS) Enhancements.

(Continued)

*Primary Examiner* — Vladimir Magloire
(74) *Attorney, Agent, or Firm* — Volpe and Koenig, P.C.

(57) ABSTRACT

A method for use in an access point includes receiving a request for a reselection message from a wireless transmit/receive unit (WTRU). The reselection message is generated in response to the request and includes: at least one first identifier of one or more candidate basic service sets (BSSs) that may be considered for reselection; a preference indicator associated with each candidate BSS, to indicate the BSS selection preference; an expiration time indicator associated with each candidate BSS, to indicate a time period that the BSS may be considered for reselection; an indication of a measurement to be taken on a BSS and used in a target BSS reselection determination; and a margin by which the measurement must exceed a corresponding value for a currently selected BSS. The reselection message is transmitted to the WTRU. A reselection response message is received from the WTRU, indicating the target BSS reselection determination.

10 Claims, 4 Drawing Sheets

U.S. PATENT DOCUMENTS

| | | | |
|---|---|---|---|
| 5,838,730 | A | 11/1998 | Cripps |
| 6,400,953 | B1 | 6/2002 | Furukawa |
| 6,438,117 | B1 | 8/2002 | Grilli et al. |
| 6,870,822 | B2 | 3/2005 | Balogh |
| 6,978,023 | B2 | 12/2005 | Dacosta |
| 7,082,301 | B2 | 7/2006 | Jagadeesan et al. |
| 7,313,111 | B2 | 12/2007 | Hietalahti et al. |
| 2001/0046863 | A1 | 11/2001 | Rinne et al. |
| 2002/0085719 | A1 | 7/2002 | Crosbie |
| 2002/0087919 | A1 | 7/2002 | Bennett |
| 2004/0009770 | A1 | 1/2004 | Sivanandan et al. |
| 2004/0043767 | A1 | 3/2004 | Tsutsumi et al. |
| 2004/0078598 | A1 | 4/2004 | Barber et al. |
| 2004/0203745 | A1 | 10/2004 | Cooper |
| 2004/0246922 | A1 | 12/2004 | Ruan et al. |
| 2005/0059437 | A1 | 3/2005 | Son et al. |
| 2005/0090259 | A1 | 4/2005 | Jain et al. |
| 2005/0090278 | A1 | 4/2005 | Jeong et al. |
| 2005/0130658 | A1 | 6/2005 | Stephens |
| 2006/0084443 | A1 | 4/2006 | Yeo et al. |

FOREIGN PATENT DOCUMENTS

| | | |
|---|---|---|
| WO | 03/094568 | 11/2003 |
| WO | 2004/054283 | 6/2004 |

OTHER PUBLICATIONS

IEEE P802.11e/D13.0 Jan. 2005, Draft Amendment to Standard for Information Technology—Telecommunications and Information Exchange Between Systems—LAN/MAN requirements—Part 11: Wireless LAN Medium Access Control (MAC) and Physical Layer (PHY) Specifications, Amendment 8: Medium Access Control (MAC) Quality of Service (QoS) Enhancements.

IEEE P802.11k/D1.0, Jul. 2004, Draft Amendment to Standard for Information Technology—Telecommunications and Information Exchange Between Systems—LAN/MAN Specific Requirements—Part 11: Wireless Medium Access Control (MAC) and Physical Layer (PHY) Specifications, Amendment 7: Radio Resource Management.

IEEE P802.11k/D3.0, Oct. 2005, Draft Amendment to Standard for Information Technology—Telecommunications and Information Exchange Between Systems—LAN/MAN Specific Requirements—Part 11: Wireless Medium Access Control (MAC) and Physical Layer (PHY) Specifications, Amendment 9: Radio Resource Management.

Epstein et al., IEEE 802.11-05/1064r0, Wireless LANS, Normative Text Proposal for Load Balancing, Chapters 7, 10, 11 (Nov. 2005).

IEEE 802.11e, Nov. 2005, Amendment to Standard for Information Technology—Telecommunications and Information Exchange Between Systems—LAN/MAN requirements—Part 11: Wireless LAN Medium Access Control (MAC) and Physical Layer (PHY) Specifications, Amendment 8: Medium Access Control (MAC) Quality of Sevice (QoS) Enhancements.

IEEE P802.11/D0.01, Jan. 2006, Draft Amendment to Standard for Information Technology—Telecommunications and Information Exchange Between Systems—LAN/MAN Specific Requirements—Part 11: Wireless Medium Access Control (MAC) and Physical Mayer (PHY) Specifications, Amendment v: Wireless Network Management.

IEEE P802.11e/D13.0 Jan. 2005, Draft Amendment to Standard for Information Technology—Telecommunications and Information Exchange Between Systems—LAN/MAN requiremnets—Part 11: Wireless LAN Medium Access Control (MAC) and Physical Layer (PHY) Specifications, Amendment 8: Medium Access Control (MAC) Quality of Service (QoS) Enhancements.

IEEE P802.11k/D1.0, Jul. 2004, Draft Amendment to Standard for Information Technology—Telecommunications and Information Exchange Between Systems—LAN/MAN Specific Requirments—Part 11: Wireless Medium Access Control (MAC) and Physical Layer (PHY) Specifications, Amendment 7: Radio Resource Management.

IEEE P802.11k/D3.0, Oct. 2005, Draft Amendment to Standard for Information Technology—Telecommunications and Information Exchange Between Systems—LAN/MAN Specific Requiremnts—Part 11: Wireless Medium Access Control (MAC) and Physical Layer (PHY) Specifications, Amendment 9: Radio Resource Management.

IEEE Wireless LAN Edition, A Compilation Based on IEEE Std 802.11-1999 (R2003) and Its Amendments.

Naylon et al., "Low-Latency Handover in a Wireless ATM LAN," IEEE Journal on Selected Areas of Communications, vol. 16, No. 6 (Aug. 1998).

METHOD AND SYSTEM FOR RESELECTING AN ACCESS POINT

CROSS REFERENCE TO RELATED APPLICATIONS

This application is a continuation of U.S. patent application Ser. No. 11/319,811, filed Dec. 28, 2005, which claims the benefit of U.S. Provisional Patent Application No. 60/679,834, filed May 11, 2005, which are incorporated by reference as if fully set forth herein.

FIELD OF INVENTION

The present invention is related to wireless communication systems. More particularly, the present invention is related to reselecting an access point (AP) in a wireless communication system including a plurality of APs and a wireless transmit/receive unit (WTRU).

BACKGROUND

A typical wireless local area network (WLAN) comprises one or more basic service set (BSS). The BSS comprises an AP with at least one WTRU associated to the AP. Typically, in a system with multiple BSSs, (and thus multiple APs), there can be great differences between the quality of the radio connection a WTRU experiences based on which AP the WTRU associates with. Similarly, the radio resources available to a WTRU depend highly on which AP to which the WTRU is associated with. The system capacity can be optimized by managing which AP each WTRU associates and reassociates with during the system operation.

The association of the WTRU and the AP is performed at the instant the WTRU joins the WLAN, (i.e., initial association). AP reselection can take place after the initial association. There are typically two reasons for the AP reselection. First, the WTRU may have moved such that the WTRU can now be better served by another AP. Second, it may be desirable for the WTRU to be served by another AP because the radio resources used by the currently serving AP are strained, (i.e., the channel used by the serving AP is congested), while a neighboring AP has spare radio resources, (i.e., its channel is less congested). It should be understood that the Load Balancing is therefore the management of appropriate points of attachment for WTRUs while roaming inside the WLAN network.

The AP reselection may be driven by either the WTRU or the network. In the WTRU-driven AP reselection, each WTRU is responsible for determining what criteria the WTRU would use for AP reselection. Because different WTRUs may use different policies, and these policies may be geared toward maximizing the quality perceived by only one WTRU rather than the quality perceived by the whole system, WTRU-driven AP reselection is not considered to perform optimally for load balancing. However, because it is the WTRU that first experiences the quality of the radio connection from the candidate APs, WTRU-driven AP reselection allows for minimal signaling and high reaction speed which is useful in cases that the WTRU is moving rapidly or that the conditions of the radio channel vary rapidly.

In the network-driven AP reselection, the AP reselection process is controlled by the AP. This allows for consistent load balancing policies across all WTRUs in the network and theoretically offers the biggest performance gains from load balancing. However, the network-driven AP reselection may require a great amount of signaling overhead and may impair the ability of the WTRU to perform quick AP reselection when needed.

SUMMARY

A list of candidate BSSs or APs is included in a medium access control (MAC) message received at a WTRU. The list includes an identity of each candidate BSS or AP and a preference indicator which indicates an extent that the candidate BSS or AP is preferred for selection and whether the candidate BSS or AP may not be considered for selection. A BSS or AP is selected by the WTRU using the list.

A method for use in an access point includes receiving a request for a reselection message from a wireless transmit/receive unit (WTRU). The reselection message is generated in response to the request and includes: at least one first identifier of one or more candidate basic service sets (BSSs) that may be considered for reselection; a preference indicator associated with each candidate BSS, to indicate an extent to which the associated candidate BSS may be preferred for selection; an expiration time indicator associated with each candidate BSS, to indicate a period of time that the associated candidate BSS may be considered for reselection; an indication of a measurement to be taken on a candidate BSS and used as a part of a target BSS reselection determination; and a margin by which a value of the measurement of the candidate BSS must exceed a corresponding value for a currently selected BSS. The reselection message is transmitted to the WTRU. A reselection response message is received from the WTRU, indicating the target BSS reselection determination of the WTRU.

A method for use in an AP includes receiving a request for a reselection message from a WTRU. The reselection message is generated in response to the request, and includes: at least one first identifier of one or more candidate APs that may be considered for reselection; a preference indicator associated with each candidate AP, wherein the preference indicator indicate an extent to which the associated candidate AP may be preferred for selection; an expiration time indicator associated with each candidate AP, wherein the expiration time indicator indicates a period of time that the associated candidate AP may be considered for reselection; an indication of a measurement to be taken on a candidate AP and used as a part of a target AP reselection determination; and a margin by which a value of the measurement of the candidate AP must exceed a corresponding value for a currently selected AP. The reselection message is transmitted to the WTRU. A reselection response message is received from the WTRU, indicating the target AP reselection determination of the WTRU.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "AP" includes but is not limited to a Node-B, a base station, a site controller or any other type of interfacing device in a wireless environment.

The features of the present invention may be incorporated into an integrated circuit (IC) or be configured in a circuit comprising a multitude of interconnecting components.

Figure 1:
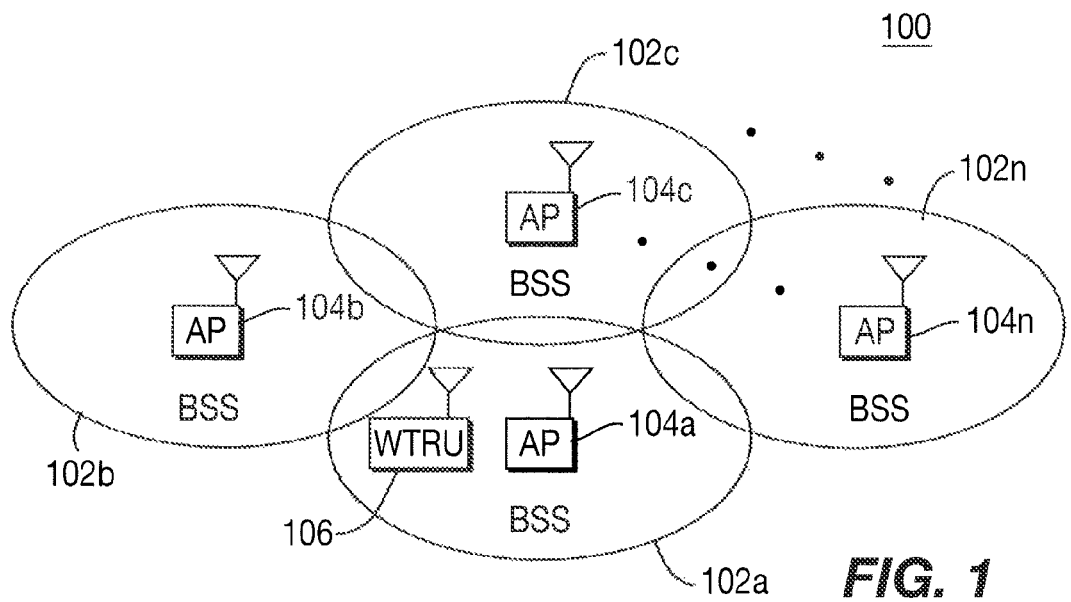
FIG. 1 shows a wireless communication system in accordance with the present invention.

FIG. 1 shows a wireless communication system 100 in accordance with the present invention. The wireless communication system 100 includes a plurality of BSSs 102a-102n. Each BSS 102a-102n comprises a respective AP 104a-104n. An association of a WTRU 106 and an AP, such as AP 104a, is performed when the WTRU 106 joins the BSS 102a covered by the AP 104a. Thereafter, AP reselection may take place as the WTRU 106 moves away from the currently associated AP 104a or the radio condition in the currently associated AP 104a changes. The coverage of the different APs 104 overlap.

Figure 2:
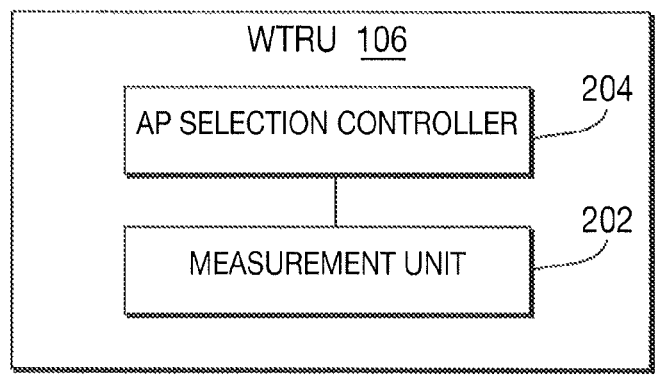
FIG. 2 is a block diagram of a WTRU used in the system of FIG. 1.

In accordance with the present invention, an AP reselection triggering function is located in the WTRU 106 and an AP reselection policy is set by the AP 104a-104n. FIG. 2 is a block diagram of the WTRU 106 used in the wireless communication system 100 of FIG. 1. The WTRU 106 of FIG. 2 includes a measurement unit 202 and an AP selection controller 204. The measurement unit 202 performs measurements in accordance with the AP reselection policy, and the AP selection controller 204 determines whether the measurement results satisfies a condition defined by the AP reselection policy for reselecting a new AP and, if so, the WTRU performs reselection to the new AP.

Figure 3:
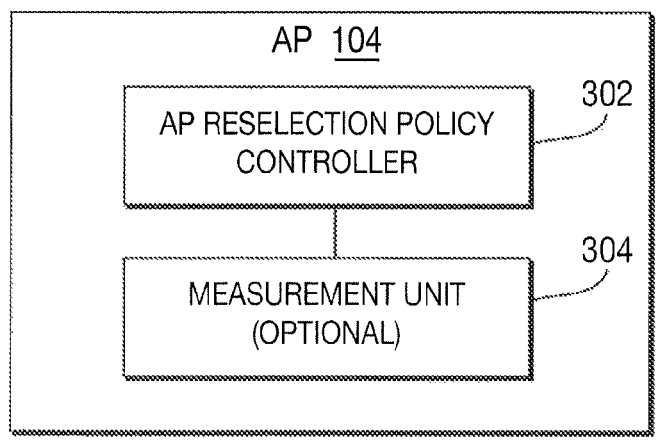
FIG. 3 is a block diagram of an AP used in the system of FIG. 1.

FIG. 3 is a block diagram of the APs 104a-104n used in the wireless communication system of FIG. 1. The AP 104 of FIG. 3 includes an AP reselection policy controller 302 for generating and sending at least one AP reselection policy and/or a set of state transition triggers to the WTRU 106, and an optional measurement unit 304 for controlling the state of the WTRU 106, (i.e., an open state or a closed state).

When the WTRU 106 considers reselecting a new AP, the decision is based on at least one AP reselection policy generated by the AP 104a-104n. In the case where multiple reselection policies are sent from the AP 104 to the WTRU 106, the AP 104 preferably signals to the WTRU 106 which policy, (or set of policies), should be used in reselecting a new AP.

Figure 5:
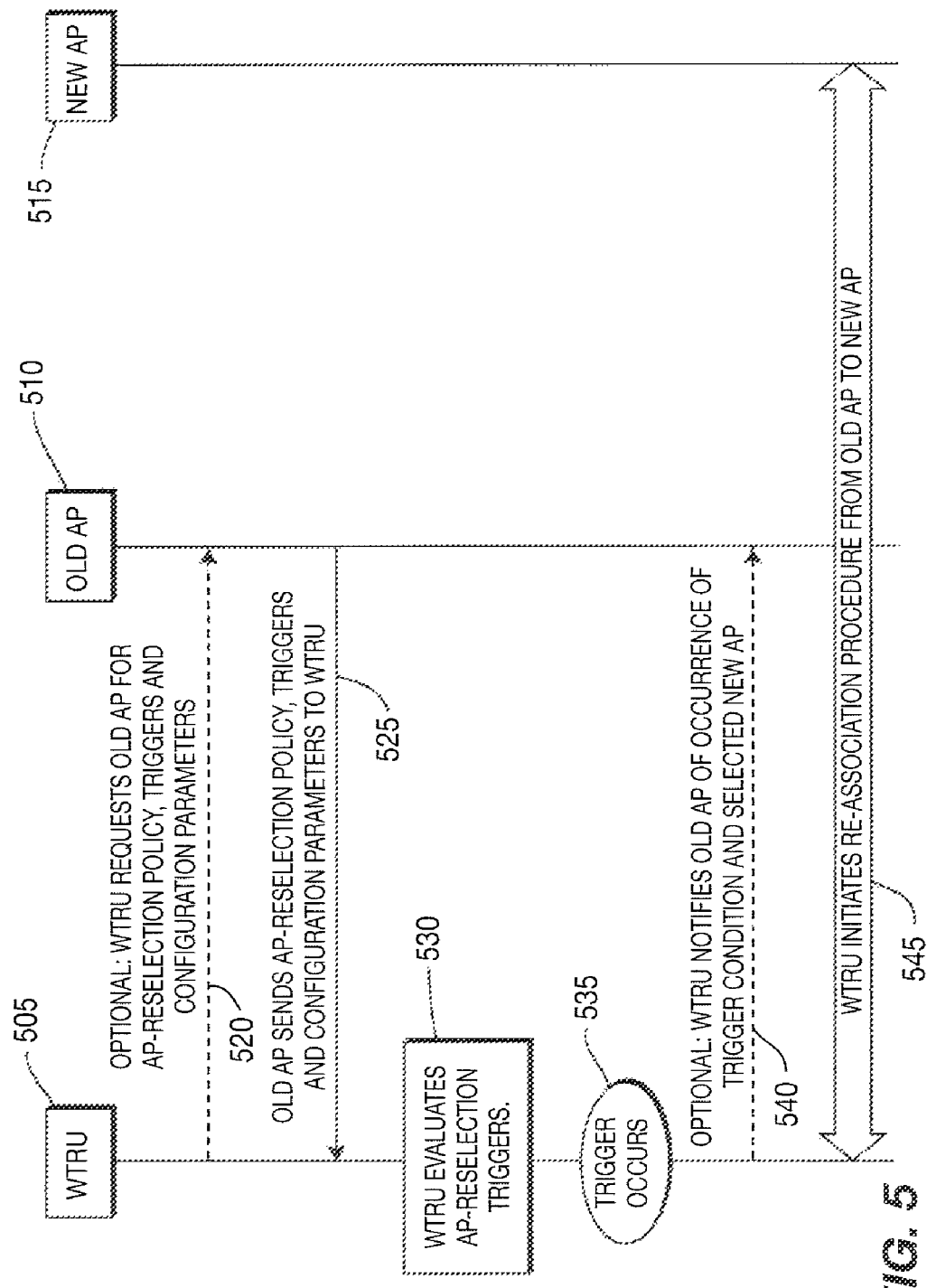
FIG. 5 is a flow diagram of a handover process in accordance with the present invention.

FIG. 5 is a flow diagram of a handover process that is implemented in a wireless communication system including a WTRU 505, an old AP 510 and a new AP 515 in accordance with the present invention.

In an optional step 520 of FIG. 5, the WTRU 505 requests the old AP 510 for an AP-reselection policy, triggers and configuration parameters. In step 525, the old AP 525 sends an AP-selection policy, triggers and configuration parameters to the WTRU 505. In step 530, the WTRU 505 evaluates AP-reselection triggers. In step 535, a trigger occurs. In optional step 540, the WTRU 505 notifies the old AP 510 of the occurrence of a trigger condition and selected new AP 515. In step 545, the WTRU 505 initiates a re-association procedure from the old AP 510 to the new AP 515.

The AP reselection policy is defined by one or a combination of the following information:

1) the measurement(s) (or quantity derived from the measurements) the WTRU has to use as part of the AP-selection procedure;

2) a margin by which the value of a measurement, (or the quantity derived from the measurement) performed on a candidate AP must exceed the corresponding value for the currently selected AP;

3) a duration for which the margin has to be exceeded before AP reselection takes place, (one duration per policy);

4) a list of candidate APs or a list of frequency channels that the WTRUs has to consider in the AP reselection process; or reversely, a list of candidate APs or list of frequency channels that the WTRUs must not consider, or a list of APs plus a associated preference values as recommended by the AP, (i.e., a list of associated side information per AP or group of APs like load or the like).

5) optionally, if more than one policy is specified, an indication whether the AP reselection takes place when any, or all, of the policies have its conditions satisfied;

6) optionally, a validity time for the AP reselection policy, (i.e. expiry time period for the AP reselection policy); and 7) optionally, an indication whether the AP reselection policy applies when a WTRU is in an associated state, in an authenticated but not associated state, or in an unauthenticated and unassociated state.

The measurements to be taken by the WTRU 106 include at least one of, but are not limited to, a load metric indicating the amount of radio resources that are used, received signal quality, (such as a signal-to-noise ratio (SNR), a signal-to-interference and noise ratio (SINR), a received signal power level, or the like), an expected instantaneous data rate achievable for transmitting or receiving packets to/from the AP based on the received signal quality, an expected average throughput (EAT) achievable for transmitting or receiving packets to/from the AP based on channel utilization (CU) and the received signal quality. The CU is defined as the fraction of time the wireless medium is perceived as "busy" on the frequency channel. The EAT may be estimated by the following formula: $EAT = \text{data rate} \times (1-CU)$.

The load metric may be a channel-based load metric or an AP-based load metric. The channel-based load metric includes the fraction of the time during which the channel is free on the frequency channel that the AP operates on. The channel-based load metric is equivalent to $(1-CU)$. The AP-based load metric includes, but is not limited to, allocated time units and the number of queued packets.

The margin, (i.e., hysteresis), is defined to avoid prematurely reselecting a new AP and subsequently reverting to the original AP leading to frequent switching back and forth between APs 104a-104n.

When a WTRU 106 is already associated to an AP, such as AP 104a, the WTRU 106 may or may not be considering reselecting another AP 104b-104n. In accordance with the present invention, two states are defined for the WTRU 106: a closed state and an open state. In the closed state, the WTRU 106 is not applying any AP reselection policy and does not consider reselecting an AP. In the open state, the WTRU 106 applies the AP reselection policy and reselects an AP when the condition stated in the AP reselection policy is met.

In accordance with one embodiment of the present invention, the WTRU 106 is always in the open state and, therefore, always applies the AP reselection policy. Alternatively, the WTRU 106 switches from the closed state to the open state, or vice versa, if a certain state transition triggering condition is met. The state transition triggering condition is met if a measurement result exceeds, (above or below depending on the nature of the measurement), a corresponding threshold for a pre-specified period of time. Alternatively, the AP 104a can switch the state of the WTRU 106, (or group of WTRUs in its BSS), between the open state and the closed state by explicit signaling if a state transition triggering condition as observed by the AP 104a for the WTRU 106 is met.

The state transition triggering condition may be monitored by the WTRU 106, the AP 104a-104n or both. If the WTRU 106 monitors the state transition triggering condition, the WTRU 106 autonomously switches the state, once the state transition triggering condition is met. If the AP 104a-104n monitors the state transition triggering condition, the AP 104a-104n sends a signal to the WTRU 106 to change the state by means of layer 2 (L2) or layer 1 (L1) signaling once the state transition triggering condition is met.

The state transition triggering condition for switching the state is met if one of the following events, but not limited to, occur. For the conditions "above" and "below" in the following events, the condition in the parenthesis applies to change the state from the open state to the closed state, and the condition not in the parenthesis applies to change the state from the closed state to the open state. Some of these triggers could be measured at either the AP or STA side. For example, the data rate of transmitted packets could be monitored by the AP 104 (downlink). Based on this, the AP 104 could determine to put the WTRU 106 in an open state. When the measurement can be performed from the AP side, then this applies for the case where the AP 104 sets the state of the WTRU, whereas when the measurement is performed from the WTRU side, then it applies for the case where the WTRU sets its state itself.

The above-mentioned state transition triggering conditions may include:

1) an error rate of transmitted or received packets above (below) a threshold for a predetermined period of time;

2) a medium access delay, (observed either on the contention free access portion or observed for a particular IEEE 802.11e/wireless multimedia (WMM) access category), above (below) a threshold for a period of time;

3) a data rate of transmitted packets below (above) a threshold for a period of time;

4) a data rate of received packets below (above) a threshold for a period of time;

5) a contention window size above (below) a threshold for a period of time;

6) channel occupancy above (below) a threshold for a period of time;

7) a rate of failed packet receptions above (below) a threshold for a period of time;

8) a received signal quality, (such as a received signal strength indicator (RSSI), a received channel power indicator (RCPI), an SNR, an SINR or any other relevant measurement), of the current association below (above) a threshold for a period of time;

9) timeout of a pre-configured or dynamically re-configured association evaluation timer value;

10) reception of a signaling bit flag, information field or information element part of an existing or new medium access control (MAC) frame, preferably of a management type; and 11) any combination of the above.

The thresholds may be relative or absolute values and the time period may be defined by absolute values or relative values to the occurrence of certain events, such as beacon frame transmission.

The AP 104a-104n sends unicast or multicast/broadcast-type of MAC signaling frames to the WTRU 106 to send the AP reselection related information, such as AP reselection policy(ies) and for the state transition triggering conditions. This information may be sent at regular intervals, when polled, (i.e., when the WTRU 106 explicitly requested this information from the AP 104a-104n), in an unsolicited manner or any combination thereof.

The MAC signaling frame containing AP reselection relevant information can be sent to the WTRU 106 in either an associated state, when it is in an authenticated but unassociated state or when it is in an unauthenticated and unassociated state. Different AP reselection policies and state transition triggers may be selected depending on the current status of the WTRU 106. Alternatively, the information may be sent to the WTRU 106 as part of an existing MAC frame with or without modification, (management, control or data frame). The AP reselection relevant information may be included as an information field or information element in either the header or the frame body of the MAC frame. For example, the state transition flag for switching between the closed state and the open state may be sent by the AP 104a-104n using one of the currently unused and reserved bits or combination values in any part of the existing IEEE 802.11 MAC preamble, header or frame body of the MAC frames. Although most of the examples provided above related to L2 frames, one of ordinary skill in the art may implement the present invention using any other type of frames to support higher layer protocol exchanges between a WTRU and any network entity, such as those used to simple manage network protocol (SNMP) via an AP, management information bases (MIBs), or the like. Rather that explicitly signaling frames, the same can be achieved implicitly by protocol design. For example, an LB frame specified as being part of a class 3 frame may only apply to associated and authenticated states.

Figure 4:
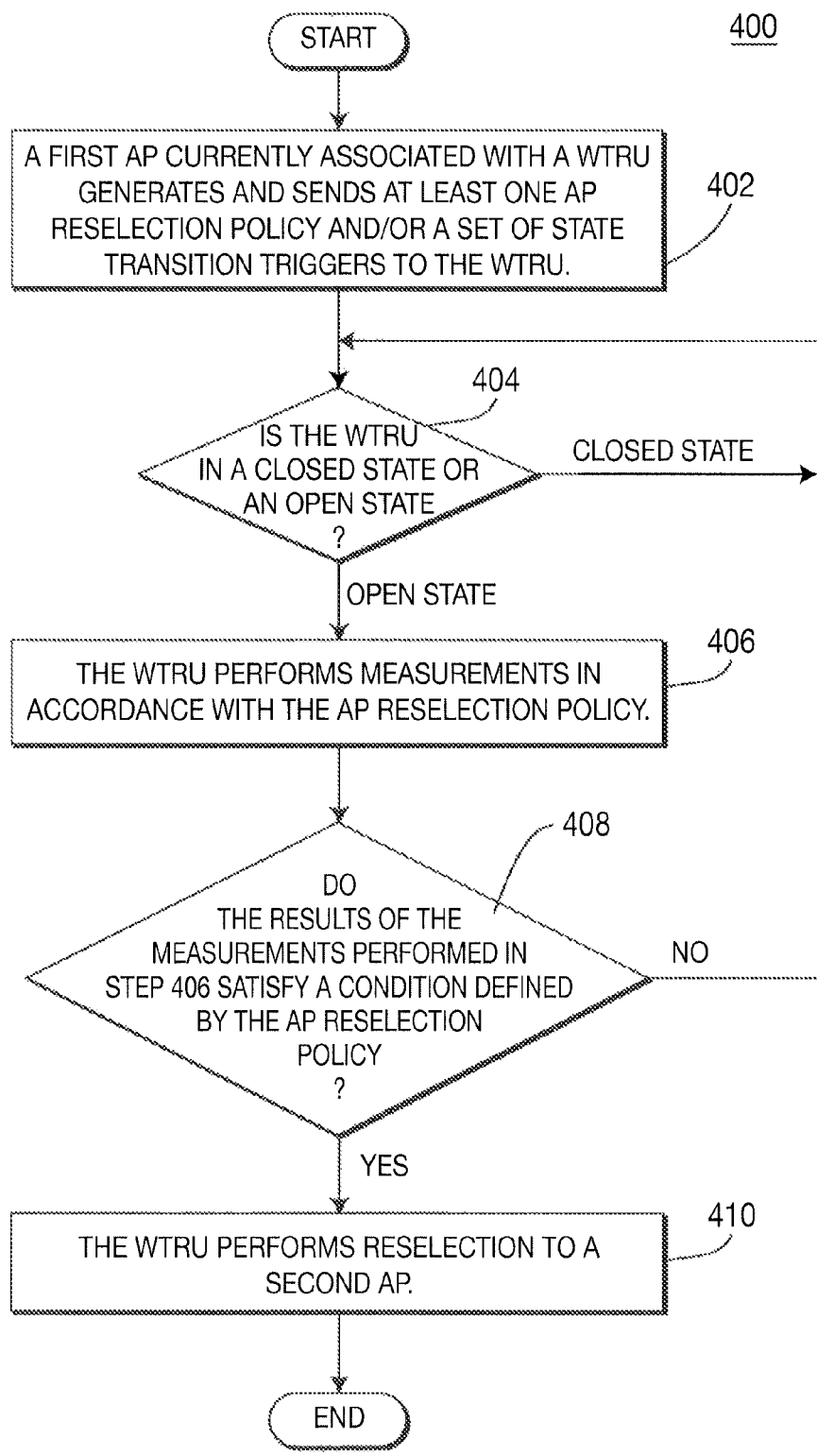
FIG. 4 is a flow diagram of a process for reselecting an AP in accordance with the present invention.

FIG. 4 is a flow diagram of a process 400 for reselecting an AP in accordance with the present invention. A first AP currently associated with a WTRU 106, generates and sends at least one AP reselection policy and/or a set of state transition triggers to the WTRU 106 (step 402). In step 404, the WTRU determines whether it is in a closed state or an open state. If the WTRU is determined to be in an open state at step 404, the WTRU 106 then performs measurements in accordance with the AP reselection policy currently in force (step 406). The AP reselection policy defines required measurements and related parameters as stated above. The WTRU 106 then determines whether the measurement results satisfy a condition defined by the AP reselection policy (step 408). The condition is satisfied if the measurement results, (or a value derived from the measurement results), for a new AP exceeds, (above or below depending on the nature of the measurement), a corresponding threshold by the margin for the duration defined in the AP reselection policy. If the condition is satisfied, the WTRU 106 performs reselection to a second AP (step 410). If not, the currently selected AP is maintained and the process 400 returns to step 404.

In case that more than one candidate AP meets the condition defined by the policy, the WTRU 106 may select an AP whose measurement value exceeds that of the currently selected AP by the largest amount.

The AP 104a-104n may define multiple policies and the WTRU 106 may optionally use a combination of policies to determine which AP to reselect to. In this case, the WTRU 106 may elect to reselect a new AP if any one of the policies in the combination has its conditions satisfied, or alternatively if all policies in the combination have their conditions satisfied. Preferably, the AP 104a-104n signals to the WTRU 106 which policy, (or set of policies), should be used in reselecting a new AP.

Figure 6:
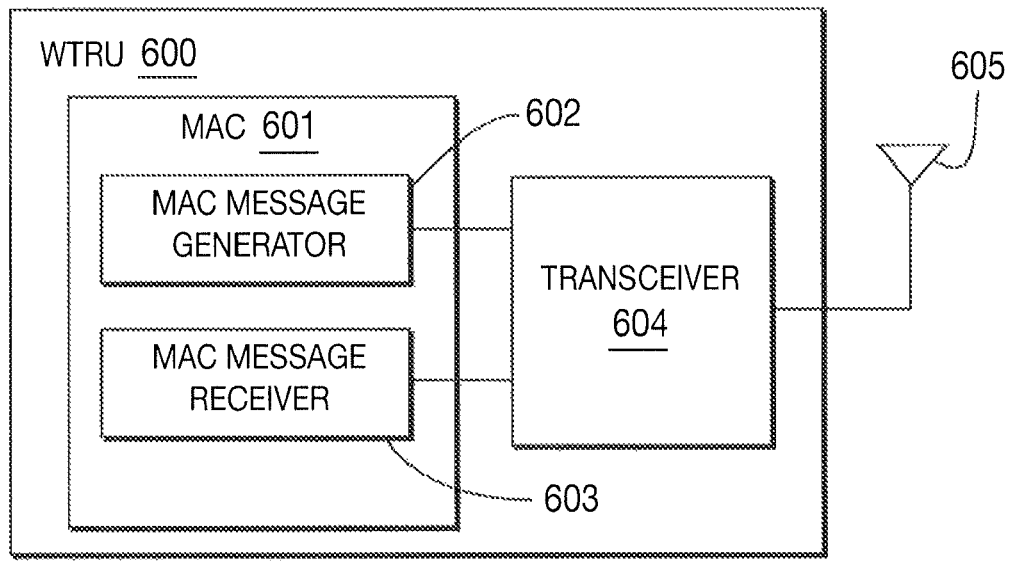
FIG. 6 is a simplified block diagram of a WTRU 600 utilizing MAC messaging.

FIG. 6 is a simplified block diagram of a WTRU 600 utilizing MAC messaging. A MAC 601 has a MAC message generator 602 which produces MAC messages and a MAC message receiver 603 which receives MAC messages. A transceiver 604 transmits the produced MAC messages and receives MAC messages utilizing an antenna or antenna array 605.

Figure 7:
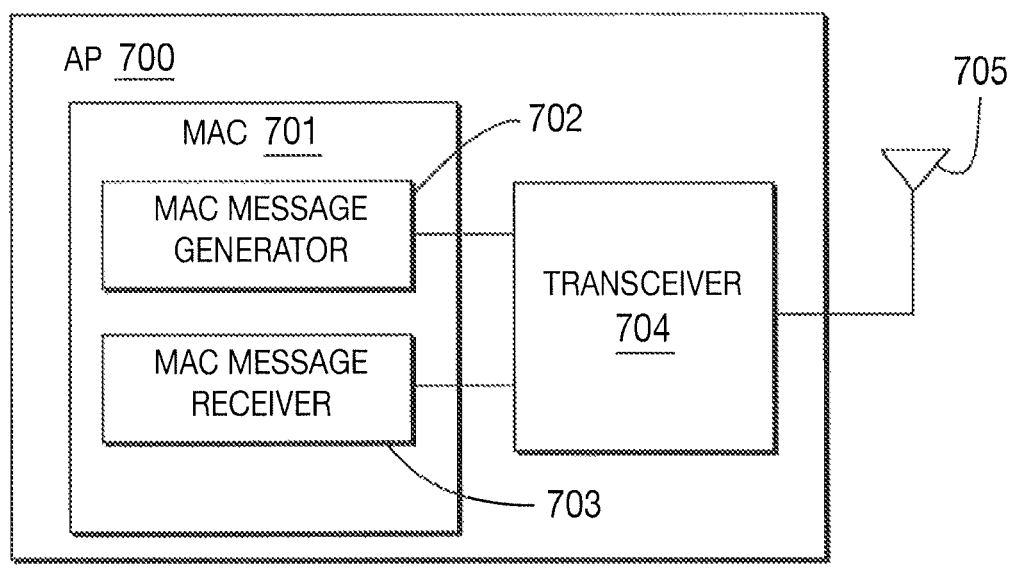
FIG. 7 is a simplified block diagram of an AP 700 utilizing MAC messaging.

FIG. 7 is a simplified block diagram of an AP 700 utilizing MAC messaging. A MAC 701 has a MAC message generator 702 which produces MAC messages and a MAC message receiver 703 which receives MAC messages. A transceiver 704 transmits the produced MAC messages and receives MAC messages using an antenna or antenna array 705.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in an access point, comprising:
   receiving a request for a reselection message from a wireless transmit/receive unit (WTRU);
   generating the reselection message in response to the request, the reselection message including:
      at least one first identifier of one or more candidate basic service sets (BSSs) that may be considered for reselection;
      a preference indicator associated with each candidate BSS, wherein the preference indicator indicates an extent to which the associated candidate BSS may be preferred for selection;
      an expiration time indicator associated with each candidate BSS, wherein the expiration time indicator indicates a period of time that the associated candidate BSS may be considered for reselection;
      an indication of a measurement to be taken on a candidate BSS and used as a part of a target BSS reselection determination; and
      a margin by which a value of the measurement of the candidate BSS must exceed a corresponding value for a currently selected BSS;
   transmitting the reselection message to the WTRU; and
   receiving a reselection response message from the WTRU indicating the target BSS reselection determination of the WTRU.

2. The method according to claim 1, wherein the reselection message indicates a frequency channel of each candidate BSS.

3. The method according to claim 1, wherein the reselection message indicates load information for each candidate BSS.

4. The method according to claim 1, wherein the reselection message is included in a medium access control frame.

5. The method according to claim 1, wherein the reselection message further includes at least one second identifier of one or more candidate BSSs that may not be considered for reselection.

6. A method for use in an access point (AP), comprising:
   receiving a request for a reselection message from a wireless transmit/receive unit (WTRU);
   generating the reselection message in response to the request, the reselection message including:
      at least one first identifier of one or more candidate APs that may be considered for reselection;
      a preference indicator associated with each candidate AP, wherein the preference indicator indicate an extent to which the associated candidate AP may be preferred for selection;
      an expiration time indicator associated with each candidate AP, wherein the expiration time indicator indicates a period of time that the associated candidate AP may be considered for reselection;
      an indication of a measurement to be taken on a candidate AP and used as a part of a target AP reselection determination; and
      a margin by which a value of the measurement of the candidate AP must exceed a corresponding value for a currently selected AP;
   transmitting the reselection message to the WTRU; and
   receiving a reselection response message from the WTRU indicating the target AP reselection determination of the WTRU.

7. The method according to claim 6, wherein the reselection message indicates a frequency channel of each candidate AP.

8. The method according to claim 6, wherein the reselection message indicates load information for each candidate AP.

9. The method according to claim 6, wherein the reselection message is included in a medium access control frame.

10. The method according to claim 6, wherein the reselection message further includes at least one second identifier of one or more candidate APs that may not be considered for reselection.

* * * * *